United States Patent [19]
McCabe

[11] Patent Number: 6,010,307
[45] Date of Patent: *Jan. 4, 2000

[54] PROPELLER, STRUCTURES AND METHODS

[76] Inventor: Francis J. McCabe, #6 Bunker Hill Rd., Ottsville, Pa. 18942

[*] Notice: This patent is subject to a terminal disclaimer.

[21] Appl. No.: 09/012,263

[22] Filed: Jan. 23, 1998

Related U.S. Application Data

[63] Continuation-in-part of application No. 08/990,201, Dec. 3, 1997, and application No. 08/685,134, Jul. 24, 1996, Pat. No. 5,711,653, which is a continuation-in-part of application No. 08/507,129, Jul. 31, 1995, Pat. No. 5,599,172.

[51] Int. Cl.[7] .................................................. F04D 29/38
[52] U.S. Cl. ................. 416/237; 416/223 R; 415/146; 415/147; 454/351; 454/353
[58] Field of Search ................................ 416/223 R, 228, 416/235, 236 R, 237, 197 R, 197 A, 197 B; 415/146, 147, 148, 150, 151, 157, 158; 454/259, 350, 351, 353; 244/198, 218

[56] References Cited

U.S. PATENT DOCUMENTS

| | | |
|---|---|---|
| 1,025,428 | 5/1912 | Stanschus . |
| 1,508,086 | 9/1924 | Crawford ................................ 416/237 |
| 1,818,607 | 8/1931 | Campbell ............................... 416/237 |
| 2,004,853 | 6/1935 | Crary . |
| 2,906,349 | 9/1959 | Hans et al. ............................. 416/237 |
| 3,807,663 | 4/1974 | Bartoe . |
| 3,910,531 | 10/1975 | Leomand . |
| 4,021,135 | 5/1977 | Pedersen et al. . |
| 4,055,950 | 11/1977 | Grossman . |
| 4,075,500 | 2/1978 | Oman et al. . |
| 4,080,100 | 3/1978 | McNeese . |
| 4,132,499 | 1/1979 | Igra . |
| 4,140,433 | 2/1979 | Eckel . |
| 4,143,992 | 3/1979 | Crook . |
| 4,204,799 | 5/1980 | deGeus . |
| 4,236,083 | 11/1980 | Kenney . |
| 4,324,985 | 4/1982 | Oman . |
| 4,447,738 | 5/1984 | Allison . |
| 4,655,122 | 4/1987 | McCabe . |
| 4,720,640 | 1/1988 | Anderson et al. . |
| 4,784,570 | 11/1988 | Bond . |
| 4,859,140 | 8/1989 | Passadore ............................... 415/157 |
| 5,332,354 | 7/1994 | Lamont . |
| 5,457,346 | 10/1995 | Blumberg . |
| 5,599,172 | 2/1997 | McCabe . |
| 5,711,653 | 1/1998 | McCabe . |
| 5,827,044 | 10/1998 | Yazici et al. ........................... 415/150 |

FOREIGN PATENT DOCUMENTS

| | | |
|---|---|---|
| 365045 | 9/1906 | France . |
| 39960 | 1/1937 | Netherlands . |
| 407633 | 3/1934 | United Kingdom . |
| 643237 | 9/1950 | United Kingdom . |
| 2036193 | 6/1980 | United Kingdom . |
| 2068472 | 8/1981 | United Kingdom . |
| 2175963 | 12/1986 | United Kingdom . |
| 8100286 | 2/1981 | WIPO . |
| 9201866 | 2/1992 | WIPO . |

OTHER PUBLICATIONS

Kentfield & Clavelle, "The Flow Physics of Gurney Flaps, Devices for Improving Turbine Blade Performance," (1993), pp. 24–34, 17 Wind Engineering #1, Brentwood, Essex, GB. Gurney flap illustrations on automobile chassis, no date.

*Primary Examiner*—Christopher Verdier
*Attorney, Agent, or Firm*—Frank J. Benasutti

[57] ABSTRACT

An aerodynamic-shaped propeller blade. The blade has a cross-section which is essentially an inverted pan-shape with an intermediate section, a leading edge section, and a trailing edge section which form concave and convex surfaces. The trailing edge has a flange doubled back toward the leading edge within the concave envelope.

6 Claims, 8 Drawing Sheets

PROPELLER, STRUCTURES AND METHODS

CROSS REFERENCE TO RELATED APPLICATIONS

This application is a continuation-in-part of my prior application Ser. No. 08/685,134 filed Jul. 24, 1996, now U.S. Pat. No. 5,711,653, issued Jan. 27, 1998 entitled AIR LIFTED AIRFOIL, the disclosure of which is incorporated herein by reference; which was a continuation-in-part of my prior then application Ser. No. 08/507,129 filed Jul. 31, 1995 entitled WIND ENERGY CONVERSION SYSTEM, now U.S. Pat. No. 5,599,172, the disclosure of which is also incorporated herein by reference. This application is also a continuation-in-part of my prior co-pending applications Ser. No. 08/990,201, filed Dec. 13, 1997 entitled AIR FOIL STRUCTURES AND METHOD, the disclosure of which is incorporated herein by reference and Ser. No. 09/008,042, filed Jan. 16, 1998 entitled FAN BLADE, STRUCTURES AND METHODS, the disclosure of which is incorporated herein by reference.

TECHNICAL FIELD

This invention relates to improvements in propeller blades and structures using propellers and more particularly, to the aerodynamic shape of the blade to exhibit improved air movement characteristics.

BACKGROUND ART

In the prior art, a wide variety of shapes have been used to harness the power of air. See, for example, the schematic prior art drawings shown in FIGS. 1A–1D. These shapes are designed primarily to act in response to air flowing in the direction of the arrow identified as "air flow" in FIGS. 1–3, impacting upon the angle of attack at which the airfoil blade is mounted, and causing the blade to lift. In a typical airplane wing (airfoil), for example, the angle of attack is such that a negative pressure is created above the wing (blade or airfoil) and the wing rises as the air flows across it.

In my prior art U.S. Pat. No. 4,655,122, I disclosed an improved aerodynamic shape which comprised essentially a planar face portion and leading and trailing edges associated with opposing ends of the face portion in a pan-shaped enclosure shown more particularly in the detailed cross section of FIG. 4 of that patent. This blade was shown in use in an air damper where one or more blades were pivoted for rotation within a frame. In that environment, the blades provided an increased lift when forced to open by escaping air from a structure, and thus this permitted the blades to be constructed of a relatively heavy gauge material without compromising damper efficiency. The air flow patterns and dimensions are also disclosed in detail.

It became apparent to me that the preferred blade structure had characteristics which were not known in the prior art.

DISCLOSURE OF THE INVENTION

SUMMARY OF THE INVENTION

I have invented an aerodynamic-shape for a propeller blade comprising a structure having a cross-section shape comprising an intermediary portion and leading and trailing edges associated with opposite edges of the intermediary portion to form an essentially pan-shaped structure in cross-section with convex and concave surfaces; and having a flange extending from the trailing edge back toward the leading edge in the concave area. The leading edge is defined by the edge which is directed into the air.

DESCRIPTION OF THE PREFERRED EMBODIMENTS

Figure 1A:
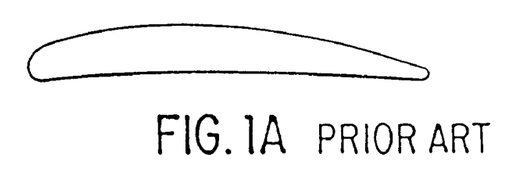
FIGS. 1A–1D are schematic views of various prior art cross-sections of airfoils.
Figure 1B:
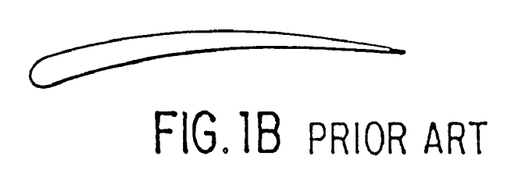
Figure 1C:
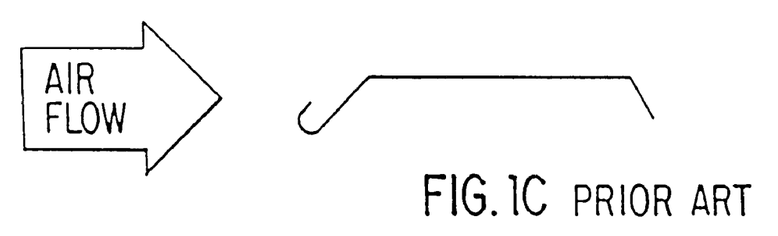
Figure 1D:
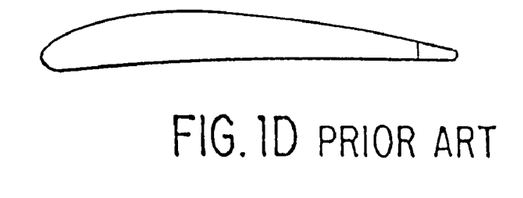
Figure 2:
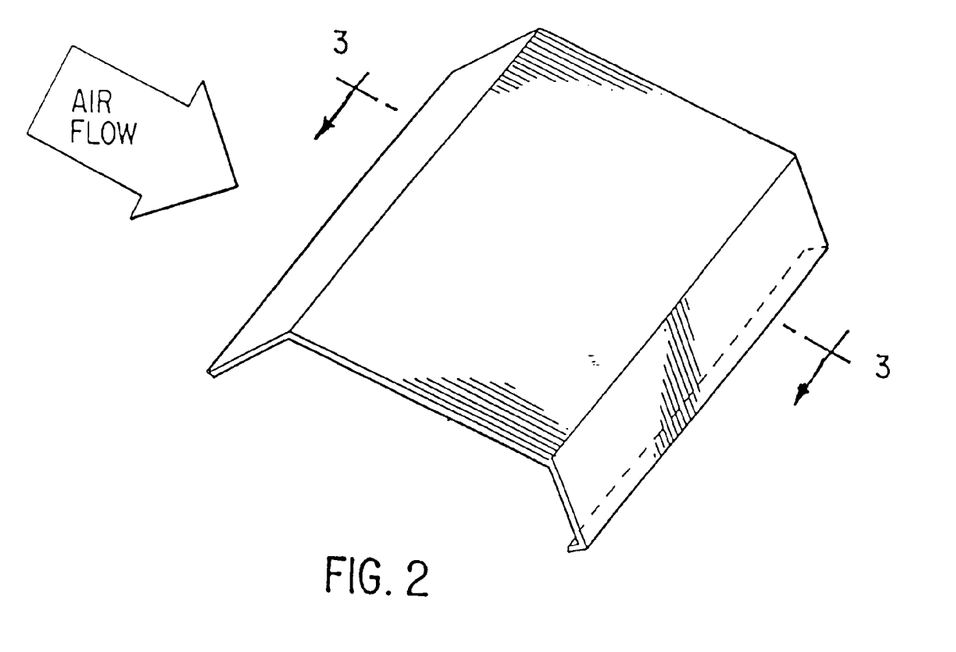
FIG. 2 is a perspective view of a portion of a preferred embodiment of my invention.

Referring to the Figures, FIG. 2 shows a perspective view of a portion of an airfoil or propeller blade in accordance with my invention.

Figure 3:
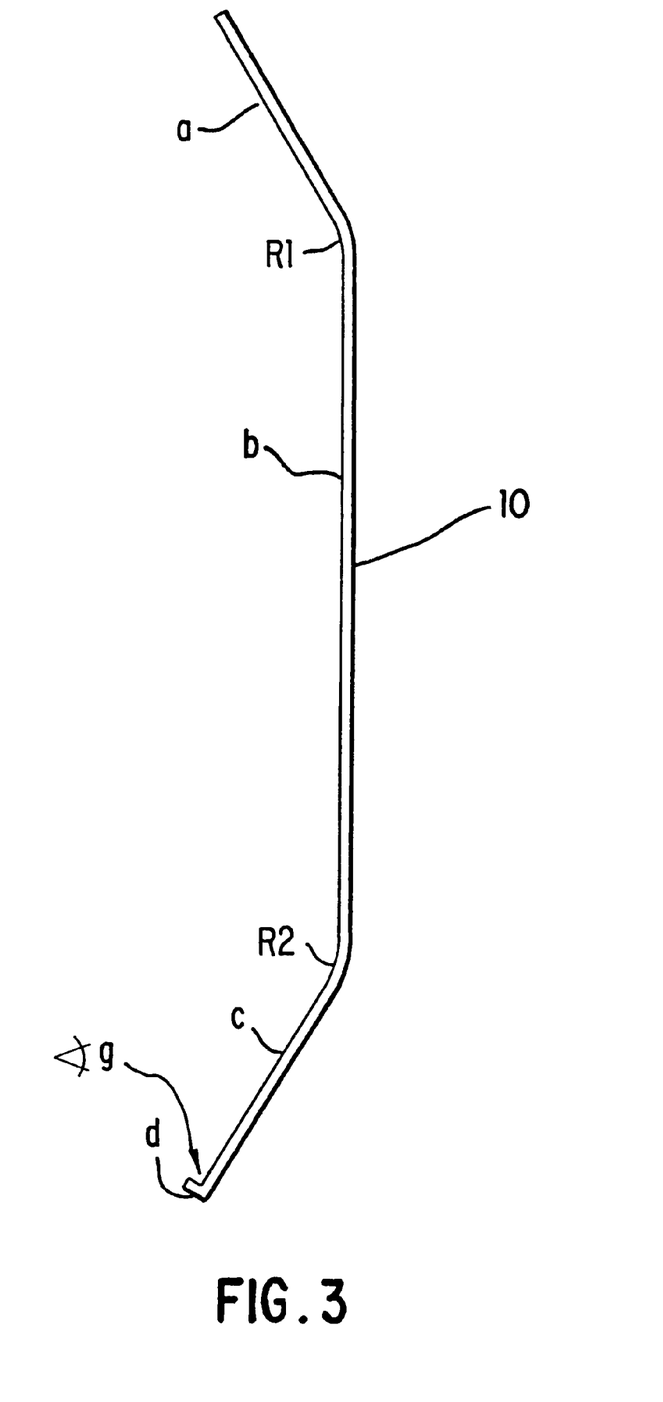
FIG. 3 is a cross-sectional view of a device in accordance with another preferred embodiment of any invention, modified from the device shown in FIG. 2 taken as indicated by the lines and arrows 3—3 in FIG. 2.

Referring now to FIGS. 2 and 3, I will describe in detail the portion of the propeller blade 10. As an example of the exact measurement and construction of this blade for use in a propeller, the dimensions are as follows: the leading edge, a=2.375"; the intermediate planar portion, b=6.750"; the trailing edge, c=2.375"; the flange, d=0.187"; the inner radius R1 is rounded and the corner radius R2 is rounded, rather than sharp as in FIG. 2; the radii R are rounded for fans and windmills and sharper 0.100" for propellers; and angle g between the portions c and d is 90°.

The cross-sectional shape of this blade shows that it comprises essentially a planar intermediate face portion "b" and leading "a" and trailing "c" edges associated with opposite longitudinal edges of said intermediate portion, such that the cross-sectional shape is pan-shaped having concave and convex surfaces; with a flange "d" extending from the trailing edge "c" back toward the leading edge "a" in the concave area.

The difference between the blade shown in section in FIG. 2, as disclosed in my prior co-pending applications, and the modification shown in this application, is that for fans (air flow) the sharp bends, as shown in FIG. 2, have been modified by slightly rounded transitional areas between the leading edge and the intermediate face portion and the trailing edge and the intermediate face portion. These curvatures are as shown by the radii R The corner between the trailing edge and the flange is sharp. For propellers, the two corners being sharper produces more thrust.

This propeller blade is preferably mounted radially from a hub so that as it rotates, the leading edge "a" impinges first on the air.

It is theorized that my improved airfoil structure has the following advantages over the prior art. The leading edge portion splits and aligns the relative wind with an essentially flat intermediate portion and with the lubricating film and mass angle increase of deflected air affecting the trailing portion.

A number of prior art blade shapes, as shown by the shapes illustrated schematically in FIGS. 1A through 1D were tested using a wind tunnel. See Windtunnel Tests disclosed in my prior applications referenced above.

The blades shown from the top are blade 1A, an ordinary airfoil carved from balsa wood in the shape used by NACA (the predecessor of NASA) for lower speed aircraft (such as gliders or model airplanes) to provide the highest lift known; a fan blade airfoil made of plastic, 1B; an airfoil blade of the type shown in U.S. Pat. No. 4,655,122, 1C; and an airfoil with a flap at the back (also per NACA) as shown in 1D.

While what I have described in my prior applications has been described in connection with a windmill and other applications, it should be apparent that what I have invented is a blade whose shape produces aerodynamic forces which can be used in a propeller or impeller or fan. I believe the angles of the leading end trailing edges, from the planar intermediate portion may be varied to enhance performance. This aerodynamic shape builds up pressure underneath more than relying on negative dynamic pressure on the top, because, I theorize, the air is dammed up within the blade envelope.

I have set out in detail in my prior applications the performance assessment of my wind energy unit in comparative wind tunnel tests. Additional wind tunnel tests were conducted on a small range and one large propeller. The small testing was done with a 6 HP air driven motor through variable gearing and mounted on two linear ball bearing rails—with "fish" type laboratory scale thrust measurements. The large propeller testing was done on a rig that was a refitted motor cycle that pivoted on the front fork as the back end rode on a very hard 10" diameter wheel that tracked on a flat steel plate. Thrust was measured by a calibrated 500 lb. loading dock pull scale. The comparison bases were: propeller thrust; RPM; noise and gear ratio. Motor HP was considered constant—as motor RPM was kept at peak by the gearing. Many configurations were measured with a final peak thrust airfoil; and angle of attack (pitch) choices made. Absolute values accuracies are probably within 10%, but comparison validity should be close to 100%.

The results were as follows:
1. Model airplane 18–22" Zinger propeller versus my original airfoil Zinger —15 lb. thrust versus just short of 15 lb. for mine —but "Zinger" RPM was 7500 versus 2500 producing approximately the same thrust. The power was maximized for both by gearing the 6 HP air motor for maximum RPM, of the motor to peak thrust RPM of the propeller.
2. An air boat "Sensenich" wooden 60" propeller was mounted and compared to my design on the 25 HP motor cycle rig, and gearing selected at maximum engine RPM to maximum thrust for each specimen. Propeller RPM: "Sensenich" 2000 to 1120 for MINP for nearly the same 210 lb. thrust, with two blades; my four blades had about 5% more thrust at 950 RPM.

Much less noise and a much smoother operation was observed with my propeller.

My airfoil design introduces an air mass acceleration and directional efficiency enhancement to air flow causing devices (fans) and thrust causing devices (propellers) and lifting devices (wings). This improved flow energy gain comes from a simply shaped rectangular blade that has a constant radial angle of attack. This economical performance advantage is allowed owing to a wider aerodynamic lift range—i.e., it has a much flatter and longer lift-angle of attack curve. Lift over drag is higher (and less torque is required) primarily because a lubricating air film is established in the area of maximum air deflection work and a much more air mass percentage is involved. Most air motion energy inducement is from underside management as opposed to Bernoulli/Venturi over the top activity—which in airfoils is more a speed inertial warp induction than a differential velocity pressure basis. My airfoil, however, is more applicable in lower air speeds and falls off in this extra efficiency as higher (tip) speeds are reached—probably 250 MPH. Two blades are sufficient, but a further RPM reduction and a very slight efficiency gain comes from four blades.

A propeller utilizing my lower speed (RPM) propeller blades can develop up to a 10% thrust increase at 40% less RPM with the same HP input. Noise output is much less.

I have observed that:
1. Geometric twist is eliminated.
2. Constant speed control for power input vs. power required and speed changes may not be as important for a flatter, wider range air foil lift to angle of attack characteristic.
3. Lower RPM's need lower speed high torque engines, such as diesel or rotating piston designs (as opposed to gear reduction). Everything slower means less materials strain/maintenance and noise.
4. The helicopter application with shorter blades may work without cyclic pitch.
5. Flat membrane shaping means vastly simplified production processes.

Since this is a new design, I think the air (swamp) boat is most appropriate—being on "acqua firma"—as opposed to aircraft.

Model airplanes are probably not best, as a low RPM engine is not available and gearing would be cumbersome.

Figure 4A:
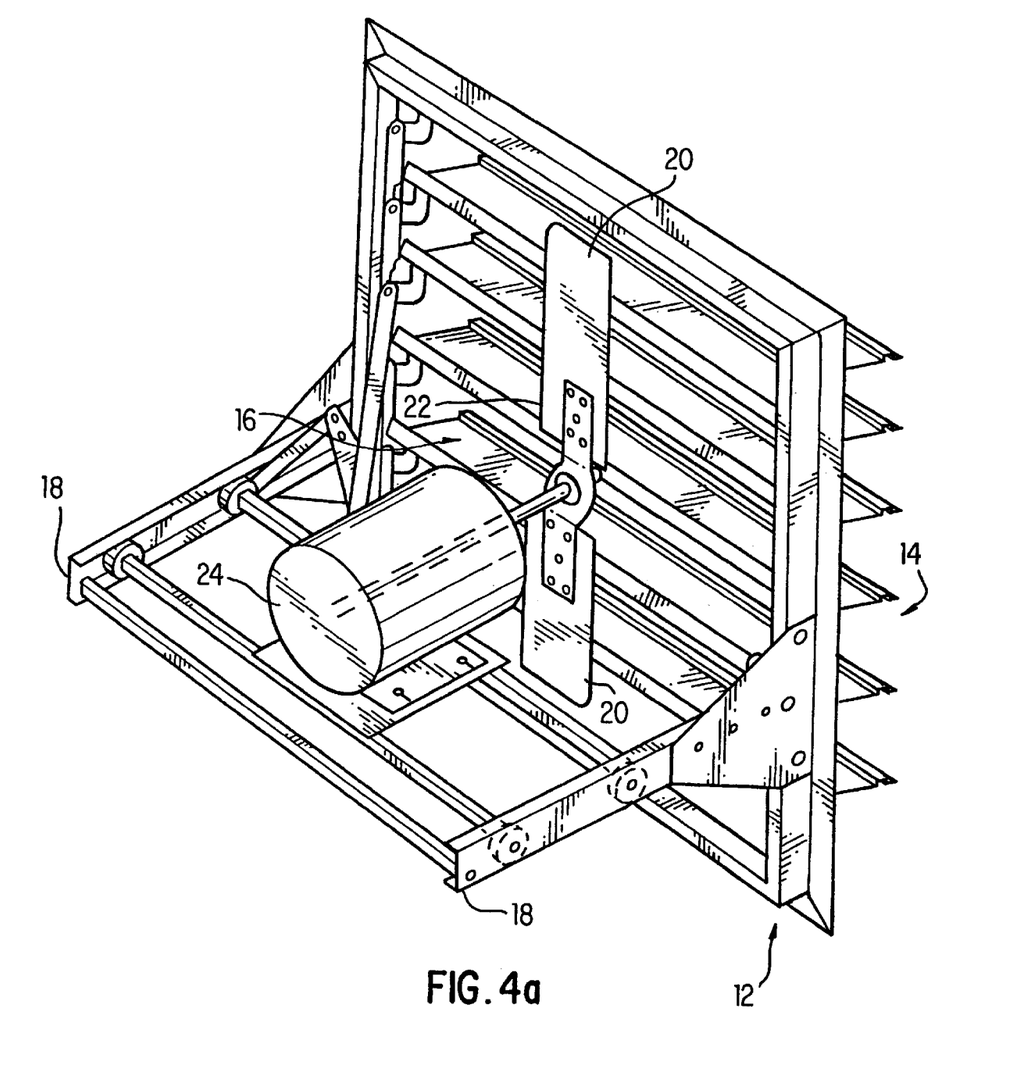
FIG. 4a is a perspective view of a damper fan assembly.
Figure 4B:
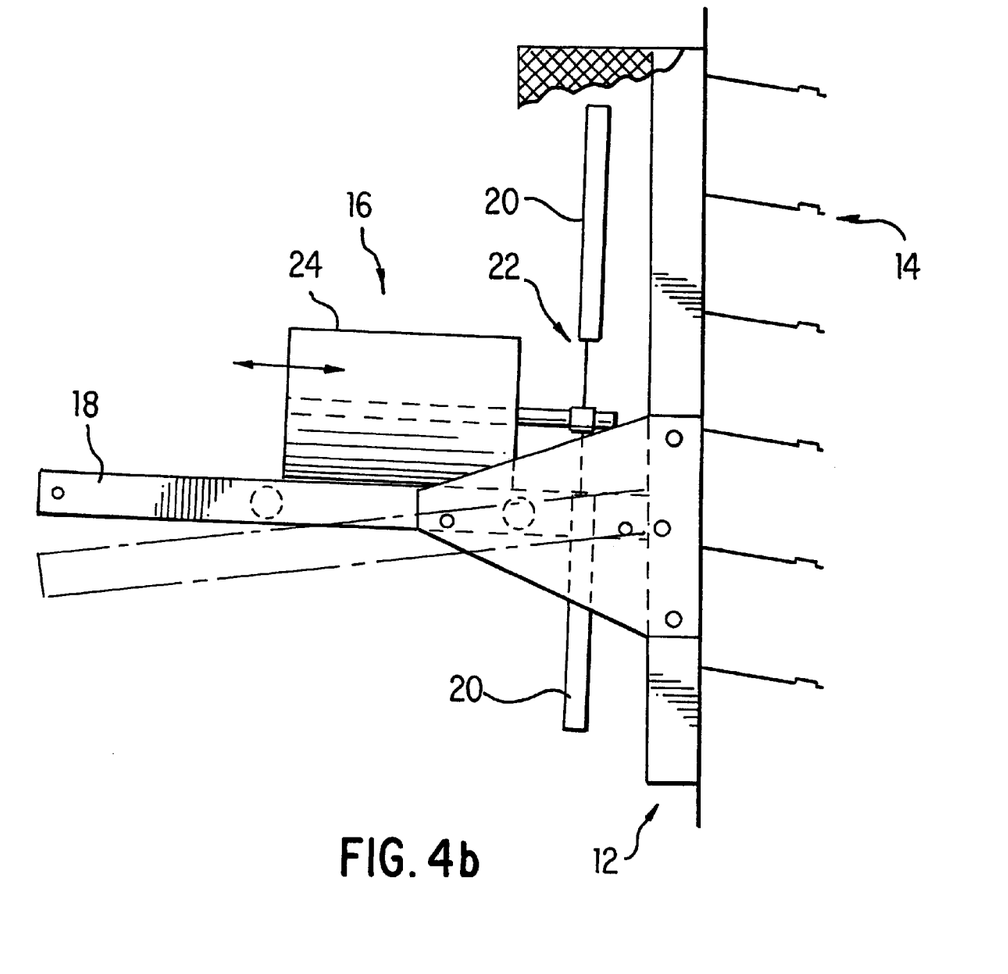
FIG. 4b is a side view of a damper fan assembly.

FIG. 4 shows a fan and damper assembly described in greater detail in my prior applications.

I also note that the damper fan assembly, as shown for example in FIG. 4, can be used as both an exhaust fan or an intake type fan. Further, it can have optimally two to four blades.

FIG. 4a depicts an apparatus set up for exhausting air through a damper 12 FIG. 4b shows an intake air version. The damper has multiple blades 14 as shown. This apparatus permits the fan and motor assembly designated generally 16 to ride on tracks 18 toward and away from the damper frame. The blades 20 of the fan 22 are initially positioned within a few inches of the damper blades 14 for the exhaust unit. When the motor 24 is started, it moves up the tracks away from the plane of the damper blades. This movement is caused by the thrust of the air generated by the blades (just like a propeller). In this way, the fan and motor assembly is propelled up the tracks. The intake air version has the blades initially further away from the damper. When the motor is started, it moves up the incline towards the damper.

Prior art devices did not utilize the thrust of the fan (propeller) in order to operate the damper. Thus, this device does three things, namely, move the fan and motor assembly, fully open the damper and move air through the damper.

An intake or exhaust version of this device can be provided by simply reversing the mounting of the blades on the motor shaft 180°.

Figure 5:
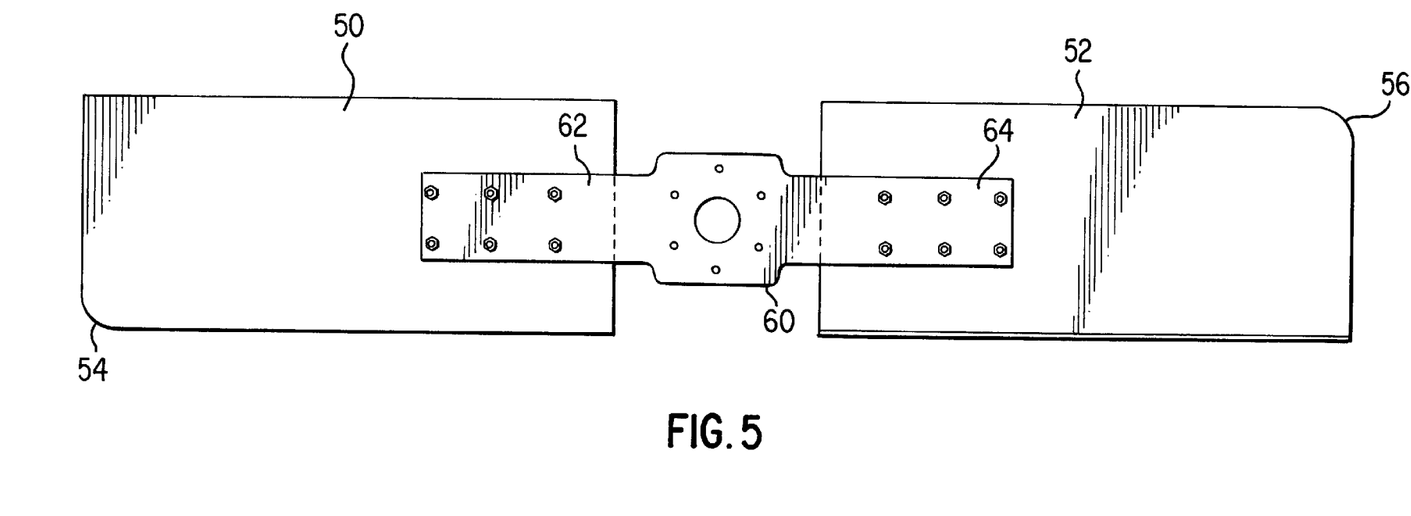
FIG. 5 is a top planar view of a plurality of blades in accordance with my invention shown mounted on a hub.

FIG. 5 shows a plan view of a two-blade propeller assembled with a hub 60. The blades 50 and 52 have rounded outer leading edge corners in plan view at the corners most remote from the hub which are part of the leading edge as shown at 54 and 56, respectively.

Figure 8:
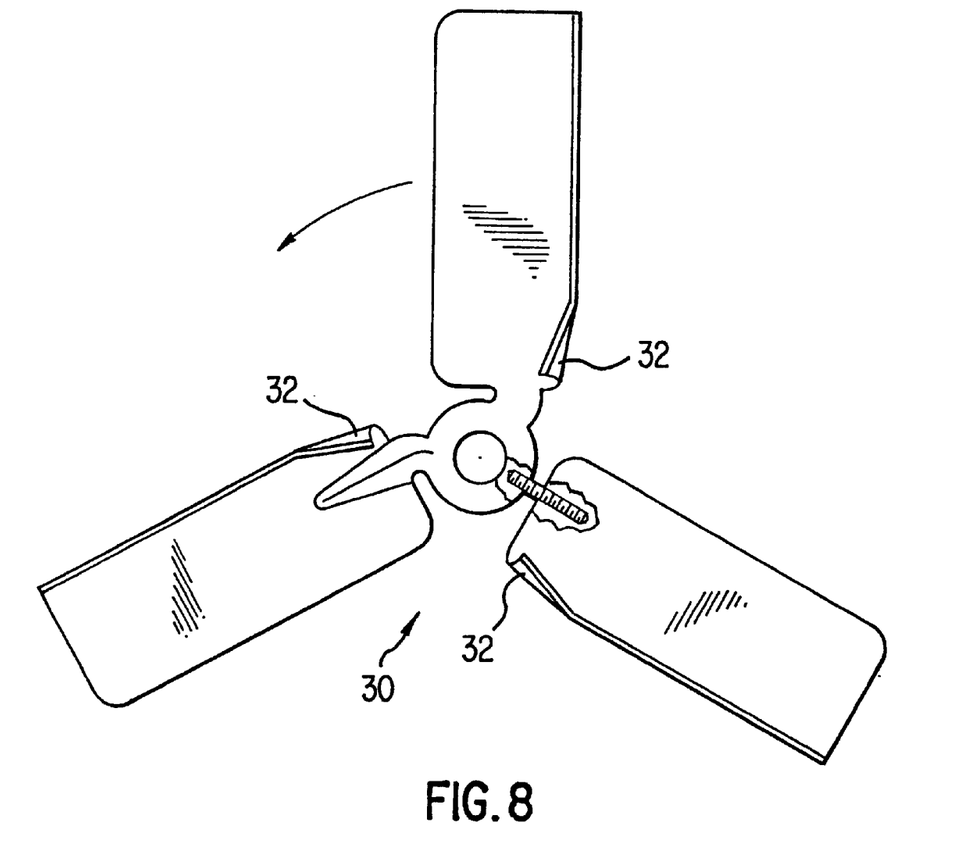
FIG. 8 is an elevation of a propeller.
Figure 8A:
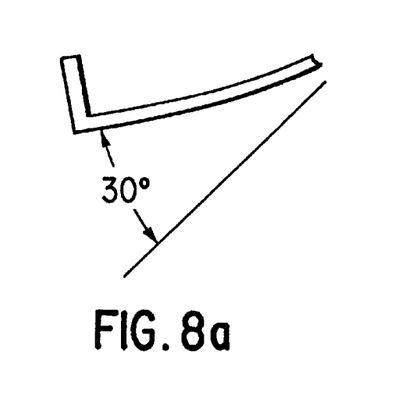
FIG. 8a is a detail of a portion of the propeller shown in FIG. 8.

FIG. 8 shows a propeller 30. The inner trailing edge corner 32 may be formed into an air scoop to aid performance. Trailing edge forward tip rake aids performance.

Figure 6:
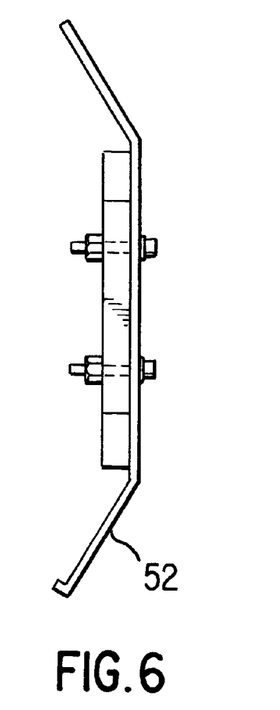
FIG. 6 is an end view of a blade shown in FIG. 5.

FIG. 6 shows the end view of the blade 52. The blades are mounted to the hub in any suitable manner such as by the bolts shown. The overall length is 60".

Figure 7:
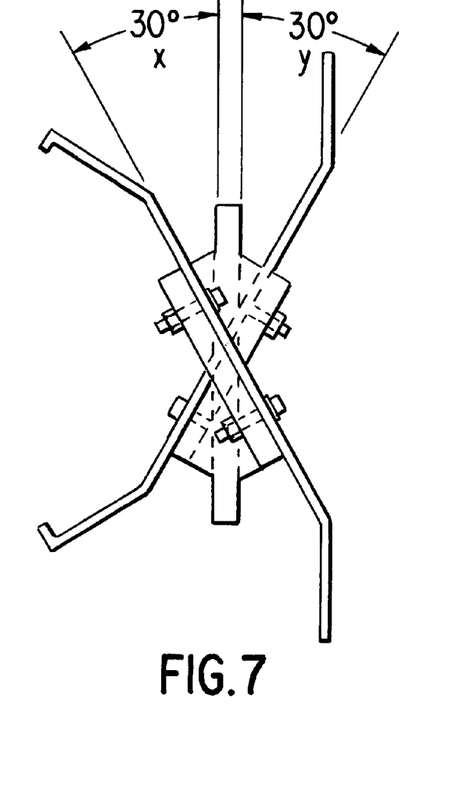
FIG. 7 is an end view of the hub and blades shown in FIG. 5 bent to a different angle.

In FIG. 7, the hub plate 60 has had its radially outwardly extending arm portions 62, 64 (FIG. 5) bent, so that the blades have an angle of attack of approximately 30° as shown by the angles "x" and "y" in FIG. 7. These angles can vary to optimize the relative wind alignment and power to thrust or air flow or lift performance.

My propeller may be useful as a helicopter propeller.

What I claim is:

1. A propeller driven apparatus having a plurality of propeller blades, each of said blades having a means for creating a lubricating film of air to reduce drag on the blade when in use in air, each of said blades having a shape comprising an intermediate face portion and leading and trailing longitudinal edge portions associated with opposite edges of the face portion to form, in cross-section, an essentially pan-shaped structure having a convex surface and a concave surface, and further comprising a flange portion extending at an angle of approximately 90 degrees from the trailing edge portion back toward the leading edge portion on the concave side, each blade positioned in said apparatus substantially radially to rotate about an axis.

2. The propeller driven apparatus of claim 1 in which the intermediate face portion, and the leading edge and trailing edge portions are associated along longitudinal areas which are curved in transition between the adjacent surfaces of the respective portions.

3. The propeller driven apparatus of claim 1 in which the blades are mounted on a hub and each blade has a tip remote from the mounting on the hub which tip is curved in plan view.

4. A method of reducing drag in a propeller driven apparatus, comprising: providing a plurality of propeller blades, each of said blades having a shape comprising an intermediate face portion and leading and trailing longitudinal edge portions associated with opposite edges of the face portion to form, in cross-section, an essentially pan-shaped structure having a convex surface and a concave surface, and a flange portion extending at an angle of approximately 90 degrees from the trailing edge portion back toward the leading edge portion on the concave side.

5. The method of reducing drag of claim 4 in which the intermediate face portion, and the leading edge and trailing edge portions are associated along longitudinal areas which are curved in transition between the adjacent surfaces of the respective portions.

6. The method of reducing drag of claim 4 in which the blades are mounted on a hub and each blade has a tip remote from the mounting on the hub which tip is curved in plan view.

* * * * *